(No Model.)

E. LISCHY.
RICE HULLER.

No. 279,404. Patented June 12, 1883.

Witnesses:
S. F. Kelcher.
N. Vignaud

Inventor:
Edward Lischy,
By T. C. Brecht,
Attorney.

UNITED STATES PATENT OFFICE.

EDWARD LISCHY, OF NEW ORLEANS, LOUISIANA.

RICE-HULLER.

SPECIFICATION forming part of Letters Patent No. 279,404, dated June 12, 1883.

Application filed February 10, 1883. (No model.)

*To all whom it may concern:*

Be it known that I, EDWARD LISCHY, a citizen of the United States, residing at New Orleans, in the parish of Orleans and State of Louisiana, have invented certain new and useful Improvements in Rice-Hullers; and I do hereby declare the following to be a full, clear, and exact description of the invention, such as will enable others skilled in the art to which it appertains to make and use the same.

My invention relates to improvements in "rice-hullers;" and the object is to produce a huller for rice and other cereals that will do the work of hulling such articles in a more effective and expeditious manner, and without breaking as many grains or seeds as is done in the ordinary manner by stampers or similar devices.

The invention consists in the construction and combination of parts, as will be more fully described hereinafter, and specifically pointed out in the claims, reference being had to the accompanying drawings and the letters of reference marked thereon.

Like letters of reference indicate like parts in the different figures of the drawings, in which—

Figure 1:
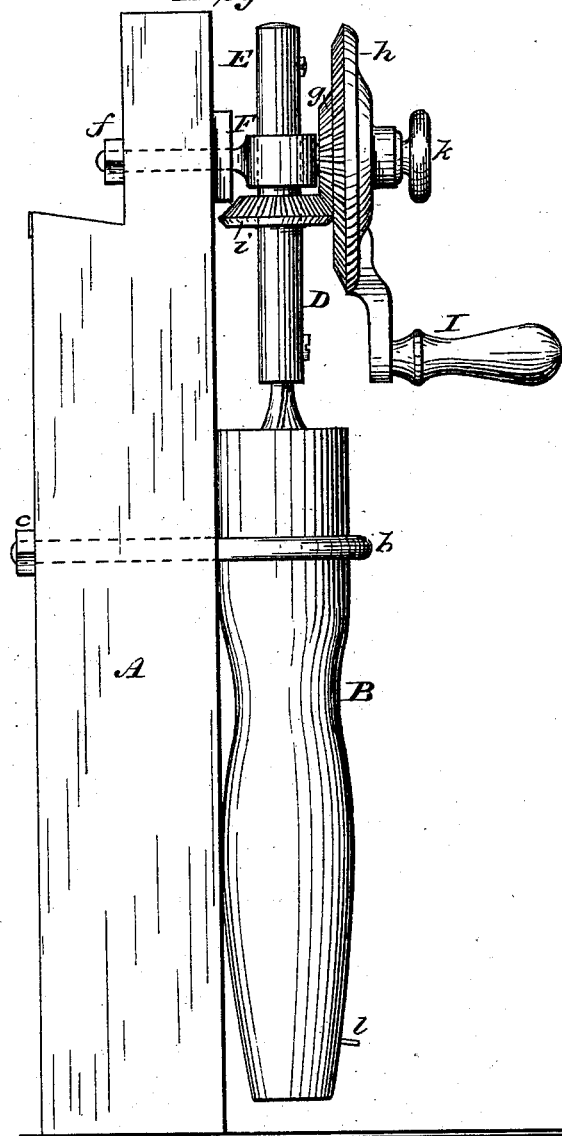
Figure 2:
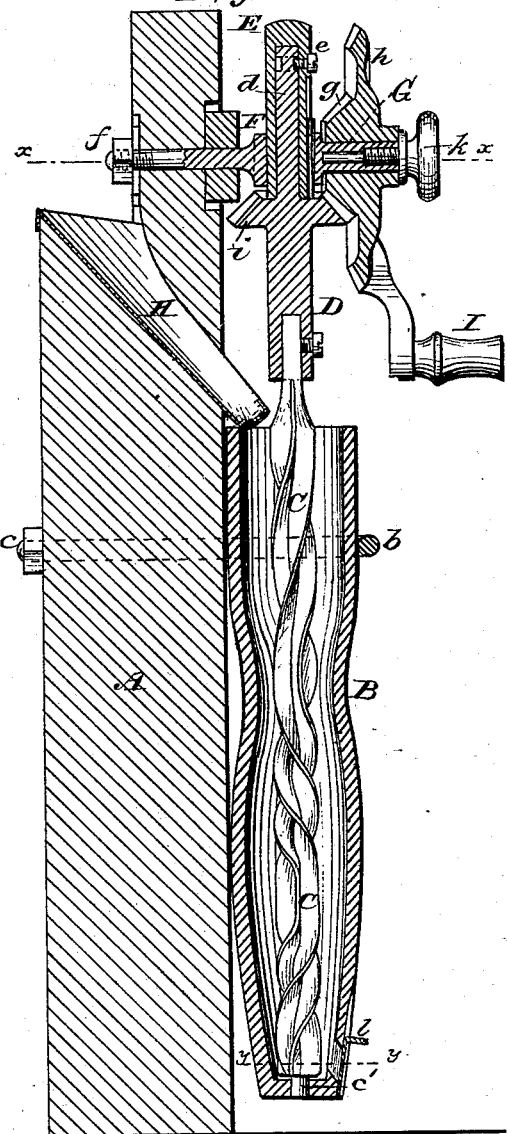
Figure 3:
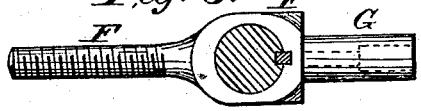
Figure 4:
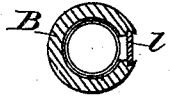

Figure 1 represents a side elevation of my improved rice-huller. Fig. 2 is a vertical section of the same. Fig. 3 is a horizontal section of certain parts on the line $x\ x$ of Fig. 2. Fig. 4 is a detail view of the bottom of the hopper at line $y\ y$, showing the slide or gate.

In the drawings, A is a suitable frame or post, to which the mortar B is secured by means of a strap or U-bolt, $b$, and nuts $c$. This mortar is of irregular shape, being large at top, then gradually reduced a short distance below the top, then gradually swelled out, and again reduced toward the bottom. In the mortar is placed a screw, C, having reversely-running threads, and running right and left handed, by which the rice or other cereals are more thoroughly agitated and thrown against the inside of the mortar, and by this the hulls are broken and removed, while the rice is more thoroughly polished than in the ordinary manner. This screw is stepped in the bottom of the mortar, as shown at $c'$ in Fig. 2. The upper end of said screw is securely held in a shaft, D, which is reduced at its upper end, as seen at $d$, and is held in place by a swivel-joint and screw $e$. It is journaled in a bracket or upright, E, which has a horizontal branch piece, F, at one side, passing through the post A, and secured to it by a nut, $f$. On its opposite side the upright has a branch piece, G, upon which the bevel-wheel $g$ and hand or driving wheel $h$ are loosely journaled, and held in place by a thumb-screw, $k$, which enters into the end of the branch piece G. The bevel-wheel $g$ meshes into another bevel-wheel, $i$, secured to the upright shaft D, and imparts motion to it and the screw. The wheel $i$ may be cast in one piece with the shaft D, if desired. The hopper H is formed in the post or frame, and preferably lined with metal, and through it the rice or cereals are conducted into the mortar. At the lower end of the mortar is arranged a gate or slide, $l$, preferably held in place by dovetailed grooves, and by it the outflow of the hulled rice or material can be regulated as desired. The time it is desired to expose the rice to the action of the screw can also be determined by the slide $l$, as by opening it wider the rice will run out sooner, and by nearly closing it, it will be retained a greater length of time in the mortar, and will be more thoroughly hulled. A suitable handle, I, is attached to the wheel $h$, by which to impart motion to the apparatus; or it may be driven by steam or other power, as desired. The threads or vanes of the screw are made quite thin, so that they can take better hold of the rice or material and exert a greater centrifugal action on it. The hopper is preferably made of the form shown to prevent the rice, &c., from being thrown out over the top, while at the same time it is prevented from clogging or choking up, which would occur if it were perfectly cylindrical.

I am aware that agitators and screws have been employed for hulling rice, also stampers, mills, shakers, &c., and therefore do not claim such, broadly; but

What I claim is—

1. The combination, in a rice-huller, of the frame A, screw C, having right and left threads running in reverse directions, a shaft, D, having at its upper end a swivel-joint formed by the upright E, and screw e, with a mortar, B, constructed as shown, and for the purpose specified.

2. The combination of a screw, C, having right and left threads running in reverse directions, with a mortar, B, shaft D, having swiveled end d, upright E, having branches F and G, beveled wheels g i, and suitable driving machinery, substantially as and for the purpose specified.

In testimony whereof I affix my signature in presence of two witnesses.

EDWARD LISCHY.

Witnesses:
N. VIGNAUD,
JOS. MAILLE.